(12) United States Patent
Bitar et al.

(10) Patent No.: US 8,250,326 B2
(45) Date of Patent: Aug. 21, 2012

(54) DATA SWAPPING IN A STORAGE SYSTEM

(75) Inventors: Akram Bitar, Kfar Peqiin (IL); Amir Sasson, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1027 days.

(21) Appl. No.: 12/201,539

(22) Filed: Aug. 29, 2008

(65) Prior Publication Data

US 2010/0058017 A1 Mar. 4, 2010

(51) Int. Cl.
*G06F 13/00* (2006.01)
*G06F 9/26* (2006.01)

(52) U.S. Cl. .................. 711/165; 711/170; 711/202

(58) Field of Classification Search .......... 711/159–165, 711/170, 200, 202; 707/1; 717/162, 173
See application file for complete search history.

(56) References Cited

U.S. PATENT DOCUMENTS

| | | | |
|---|---|---|---|
| 6,480,930 B1 * | 11/2002 | Zakai et al. | 711/105 |
| 6,701,392 B1 * | 3/2004 | Halstead et al. | 710/36 |
| 7,130,941 B2 | 10/2006 | Okada et al. | |
| 7,281,104 B1 * | 10/2007 | Tsypliaev et al. | 711/165 |
| 2006/0236006 A1 | 10/2006 | Okada et al. | |
| 2007/0016745 A1 | 1/2007 | Dalton et al. | |
| 2007/0174542 A1 | 7/2007 | Okada et al. | |
| 2008/0005507 A1 | 1/2008 | Madnani et al. | |
| 2010/0017420 A1 * | 1/2010 | Archer et al. | 707/100 |

* cited by examiner

*Primary Examiner* — Tuan Thai
*Assistant Examiner* — Zhuo Li
(74) *Attorney, Agent, or Firm* — Century IP Group, Inc.; F. Jason Far-hadian, Esq.

(57) ABSTRACT

Systems and methods for data swapping in a storage network are provided. The method comprises associating a flag with a first track on a first volume (TA1) and a first track on a second volume (TB1) to indicate that I/O access to TA1 is to be redirected to TB1, and that I/O access to TB1 is to be redirected to TA1; locking TA1 and TB1 to prohibit I/O access to TA1 and TB1; copying data stored on TA1 and TB1 to cache; swapping data between TA1 and TB1; unlocking TA1 and TB1 to allow I/O access to TA1 and TB1; redirecting I/O access to TB1, in response to receiving an I/O request to access TA1, when TA1 is flagged, and redirecting I/O access to TA1, in response to receiving an I/O request to access TB1, when TB1 is flagged.

12 Claims, 5 Drawing Sheets

Computing Environment 100

DATA SWAPPING IN A STORAGE SYSTEM

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to data swapping in computing systems and, more particularly, to a system and method for swapping data between two volumes.

BACKGROUND

Data swapping refers to an operation in which the data stored on two storage volumes are exchanged (i.e., the data stored on volume A is copied to volume B and the data stored on volume B is copied to volume A). Data swapping may be needed for data migration or, for example, when a host (e.g., a software application) is working on volume A and needs more storage than that available on volume A, or if volume A is not as fast as desirable for the intended purpose of the host. If a larger or a faster volume B is available, data between the two volumes may be swapped to accommodate the host.

Typically, to swap data between two volumes A and B, data stored on volume A is first stored on a third volume. Then the data stored on volume B is transferred to volume A. Thereafter, the data copied to the third volume (i.e., the original content of volume A) is transferred to volume B. To avoid data loss, all I/O access requests (e.g., read or write requests) to both volumes A and B are suspended during the swapping process. Thus, unfortunately, the swapping process often results in system downtime which is highly undesirable and costly, particularly where large volumes of data are to be swapped.

Methods and systems are needed that can overcome the aforementioned shortcomings.

SUMMARY

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, systems and methods for data swapping in a storage network are provided. The method comprises associating a flag with a first track on a first volume (TA 1) and a first track on a second volume (TB1) to indicate that I/O access to TA1 is to be redirected to TB1, and that I/O access to TB1 is to be redirected to TA1; locking TA1 and TB1 to prohibit I/O access to TA1 and TB1; copying data stored on TA1 and TB1 to cache; swapping data between TA1 and TB1; unlocking TA1 and TB1 to allow I/O access to TA1 and TB1; redirecting I/O access to TB1, in response to receiving an I/O request to access TA1, when TA1 is flagged, and redirecting I/O access to TA1, in response to receiving an I/O request to access TB1, when TB1 is flagged.

In accordance with one aspect of the invention, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and corresponding methods that facilitate data swapping in a computing environment.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
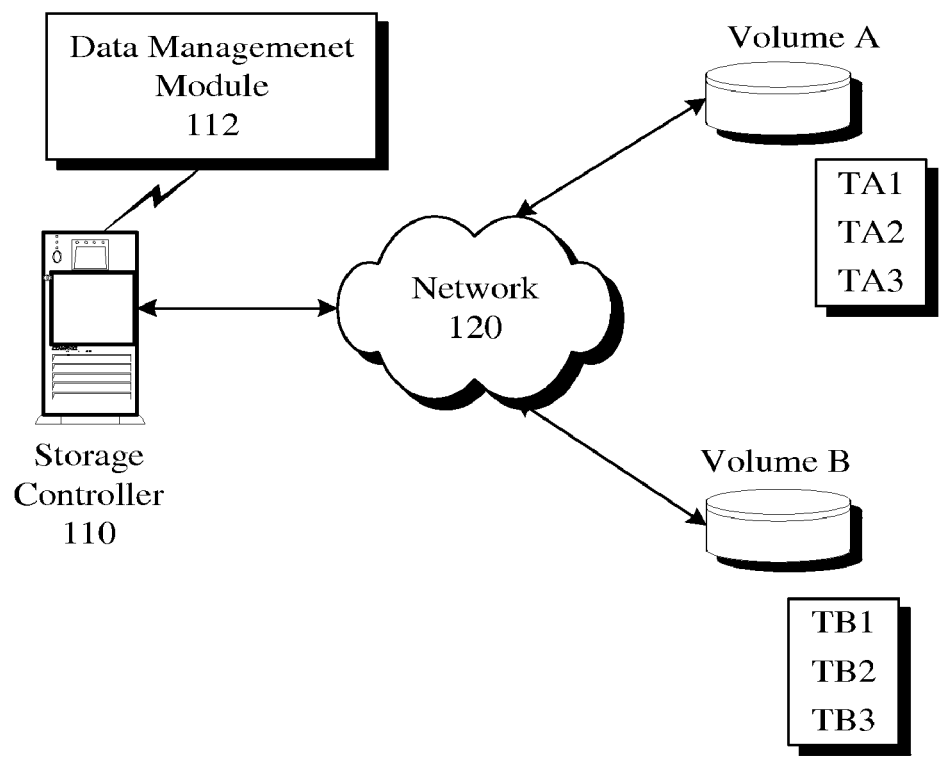
FIG. 1 illustrates an exemplary computing environment in accordance with one or more embodiments.

Referring to FIG. 1, in accordance with one embodiment, an exemplary computing environment 100 may comprise a storage controller 110 and one or more storage volumes (e.g., volumes A and B) configured to communicate with storage controller 110 over a network 120. In the exemplary embodiment illustrated in FIG. 1, each of the volumes A and B comprises a plurality of tracks (e.g., volume A: TA1, TA2, TA3, etc.; volume B: TB1, TB2, TB3, etc.) on which data may be stored.

In accordance with one embodiment, a bitmap or other data structure may be implemented to associate a value (e.g., a flag) with one or more tracks on a volume. Said flag may be set to a first value (e.g., 1) to indicate that the content of a track have been swapped with another track. Such a track may be referred to as a remote track, for example. On the other hand, the flag may be set to a second value (e.g., 0 or null) to indicate that the content of a track have not been swapped. Such a track may be referred to as local, for example.

Depending on implementation, data management module 112 may be executed over an operating system, or in a virtualized operating environment, or as a part of one or more software applications executed on storage controller 110 or other computing systems (not shown) connected to network 120 in a local or distributed network environment. Data management module 112 may be configured to swap data stored on a first volume (e.g., volume A) with a second volume (e.g., volume B).

Referring to FIG. 1, for example, when data between volume A and B is swapped, data stored on a first track of volume A (e.g., TA1) is swapped with data stored on a first track of volume B (e.g., TB1). Thereafter, data stored on a second track of volume A (e.g., TA2) is swapped with data stored on a second track of volume B (e.g., TB2) and so on, until desirably all tracks on volume A are replace with those of volume B.

In the following, one or more embodiments are disclosed wherein the swapping process is deemed to be applicable to certain tracks on the exemplary volumes A and B, and wherein a certain exemplary swapping order is discussed. It is noteworthy, however, that the above-noted application and order is by way of example and should not be construed as limiting the ideas and concepts disclosed herein to said exemplary embodiments.

For example, a certain track on volume A may be swapped with any track on volume B, even though the illustrated examples herein refer to swapping of the first track of volume A with a first track of volume B. Such designations of order with respect to the tracks and the swapping process are exemplary and non-limiting. Depending on implementation, the selected tracks for swapping may be chosen either in random or based on a heuristic, or in a particular order, without detracting the scope of the invention.

To avoid data loss or data corruption during the swapping process, certain provisions are taken into account to ensure that no I/O access is permitted to a track during certain stages of the swapping process. As noted earlier, in certain embodiments, a flag (e.g., an indicator) mechanism is utilized to allow storage controller 110 to determine whether a track on a first volume has been swapped or not. If so, then the I/O access is redirected to a track on a second volume that stores the target data.

Figure 2:
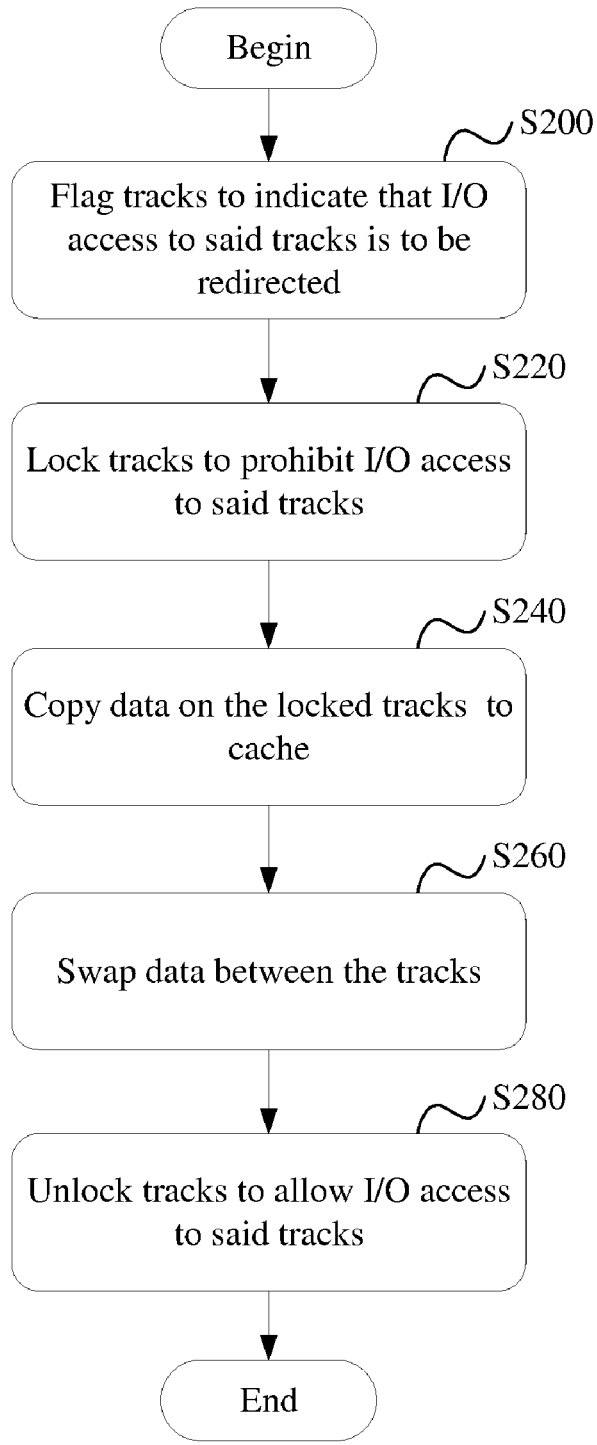
FIG. 2 is a flow diagram of a method for swapping data between two volumes, in accordance with one embodiment.

Referring to FIG. 2, for example, in one embodiment the swapping process starts with setting a flag for (e.g., associating a certain value with) the tracks that are to be swapped; the flag indicates that I/O access to those tracks is to be redirected (S200). As provided in further detail below, let us assume that a host application submits an I/O request to data management module 112 to access a track, such as a first track on volume A (e.g., TA1), wherein TA1 is being swapped with a first track on volume B (e.g., TB1), for example. Data management module 112 upon determining that TA1 is flagged, redirects the I/O request to TB1 (See FIG. 3: S300, S320, S340).

In accordance with one implementation, the redirecting scheme is desirably limited to a period when the swapping process is in progress, such that I/O calls for the swapped tracks (i.e., remote tracks) are redirected, and I/O calls for the un-swapped tracks (i.e., local tracks) are not. Once the data for all tracks on the two volumes is swapped, a system administrator or other independent operator or application may reset the flags for all tracks and dismount and remount the two volumes so that I/O calls designated for volume A are directed to volume B, and vice versa.

Accordingly, once the data for all tracks on both volumes has been swapped, there will be no need for determining which tracks have been swapped and which ones are waiting to be swapped. Thus, once the swapping is completed, the flags associated with the tracks will be unset. As noted earlier, the flag settings for the plurality of tracks on each volume may be recorded in a bitmap or other data structure, wherein each bit in the bitmap is associated with a track on a volume. In some implementations, a single bit in the bitmap may be used to record the state of the corresponding tracks on each volume.

Referring back to FIGS. 1 and 2, let's assume that TA1 and TA2 are flagged to be swapped. In one embodiment, TA1 and TA2 are locked to prohibit I/O access to said tracks during the swap (S220). In certain embodiments, the tracks may be locked prior to the tracks being flagged. A lock metaphorically refers to a state in which a track is no longer available to support a read or write request. Locking a track during the swapping process prevents data corruption and data loss because the timing for I/O access is critical during a data swap. The locking mechanism allows data management module 112 to determine when it is prudent to allow I/O access to a track so that data stored on the track is not inadvertently overwritten.

Once TA1 and TA2 are locked, data from TA1 and TA2 is copied to cache (S240). Copying the data to cache provides a level of efficiency for the swapping process because data already copied to cache can be processed at a faster pace. In alternative implementations, the data can be copied to other storage mediums, such as a temporary storage drive, for example. Depending on implementation, different algorithms may be used to swap data between TA1 and TA2 (S260). In one embodiment, the XOR algorithm provided below is utilized to swap the data of the corresponding tracks in volumes A and B and save the XORed result in cache.

A:=A XOR B
B:=A XOR B
A:=A XOR B

In one embodiment, the swap algorithm may be used to swap two volumes in the same storage controller or in different storage controllers. In one implementation, the swap is performed in one storage controller 110. In other implementations, tracks may be transferred between controllers via network 120. Accordingly, a track may be remotely swapped. In a remote swap, a flag is saved in each storage controller, and the I/O is redirected accordingly. The I/O redirection may be done from one storage controller to the other using a network interface connecting the two storage controllers.

Depending on implementation, data from more than one track per volume at a time may be transferred to cache for swapping purposes. By way of example, however, we have disclosed a scenario in which one track per volume (e.g., TA1 and TA2) is swapped at each instance. Referring back to FIG. 2, once the data stored in TA1 and TA2 is swapped, data management module 112 unlocks TA1 and TA2 to allow I/O access to the tracks. It is noteworthy that in the exemplary embodiments disclosed herein the unlocking of the tracks TA1 and TA2 allows a host I/O to read from or write to those tracks, while the swapping procedure for other tracks is ongoing.

Figure 3:
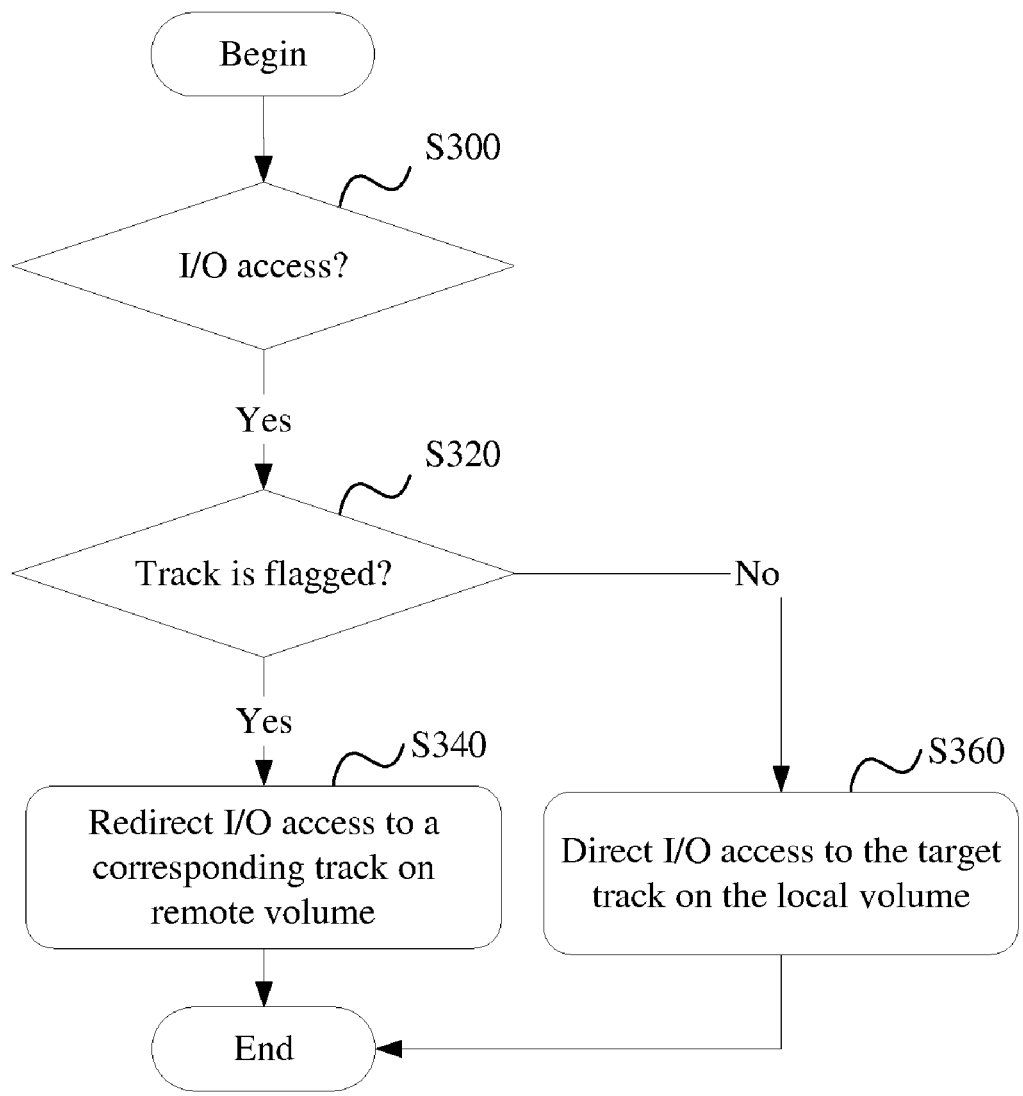
FIG. 3 is a flow diagram of a method for redirecting I/O access between tracks on the two volumes, in accordance with one embodiment.

Referring to FIG. 3, once the swapped tracks (e.g., TA1 and TA2) are unlocked, data management module 112 monitors I/O access to the tracks. If an I/O access request for a target track (e.g., TA1) is received (S300), then data management module 112 determines whether the target track is flagged (e.g., whether the target track is designated as a remote track) (S320). If so, then the I/O request is redirected to a corresponding track on a remote volume (e.g., TA2) (S340); otherwise (i.e., if the target track is determined to be local), the I/O access is directed to the target track on the local volume (e.g., TA1) (S360).

Accordingly, using the above swapping scheme, one or more tracks from a first volume are swapped with one or more tracks from a second volume. Desirably, the swapping takes place a few tracks at a time, so that while the tracks being swapped may not be accessed, the other tracks not involved in the swapping process remain available for I/O access. In this manner, advantageously, a host will be able to access most of the data stored on a volume during the swapping process, with the exception of the few that are being swapped at that particular instance.

If a target track is not available, storage controller 110 may resubmit the I/O access request at a later time, or instruct the host to resubmit the I/O request later. As suggested earlier, in one embodiment, once all the tracks between the two volumes are swapped, then values stored in the data structure (e.g., the bitmap) that is used to associate a value (e.g., flag) with each track during the swapping process is reset, so that all the tracks are designated as local tracks rather than remote tracks, for example. The two volumes may be then unmounted and remounted so that the I/O access requests submitted for the data which has been already swapped is directed to the corresponding volume.

In different embodiments, the invention can be implemented either entirely in the form of hardware or entirely in the form of software, or a combination of both hardware and software elements. For example, storage controller 110, host systems or application (not shown) and data management module 112 may comprise a controlled computing system environment that can be presented largely in terms of hardware components and software code executed to perform processes that achieve the results contemplated by the system of the present invention.

Figure 4:
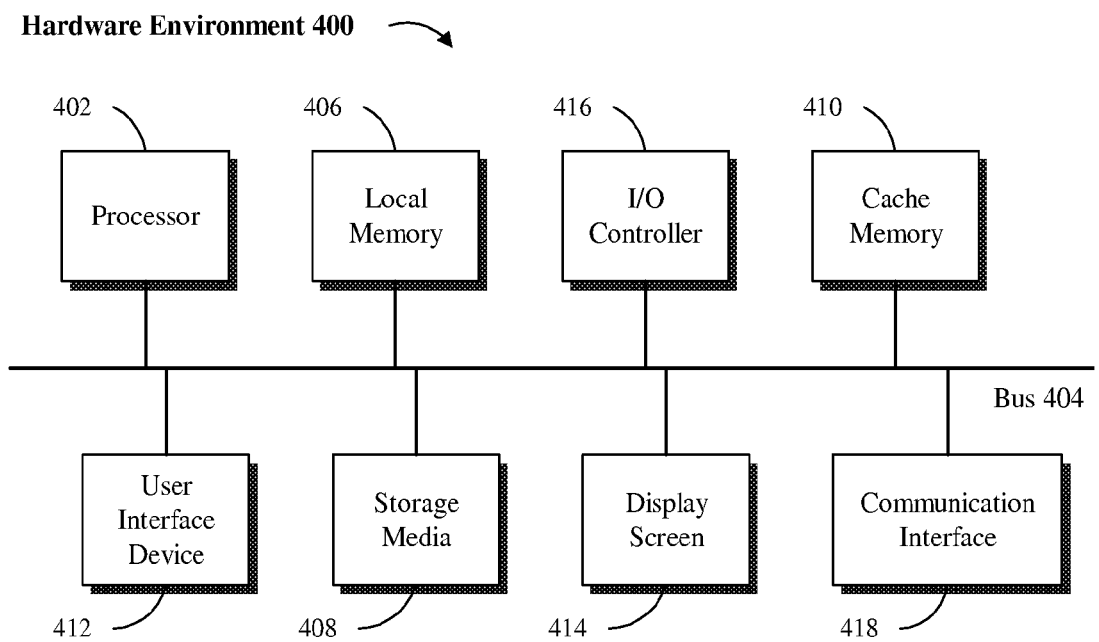
FIGS. 4 and 5 are block diagrams of hardware and software environments in which a system of the present invention may operate, in accordance with one or more embodiments.
Figure 5:
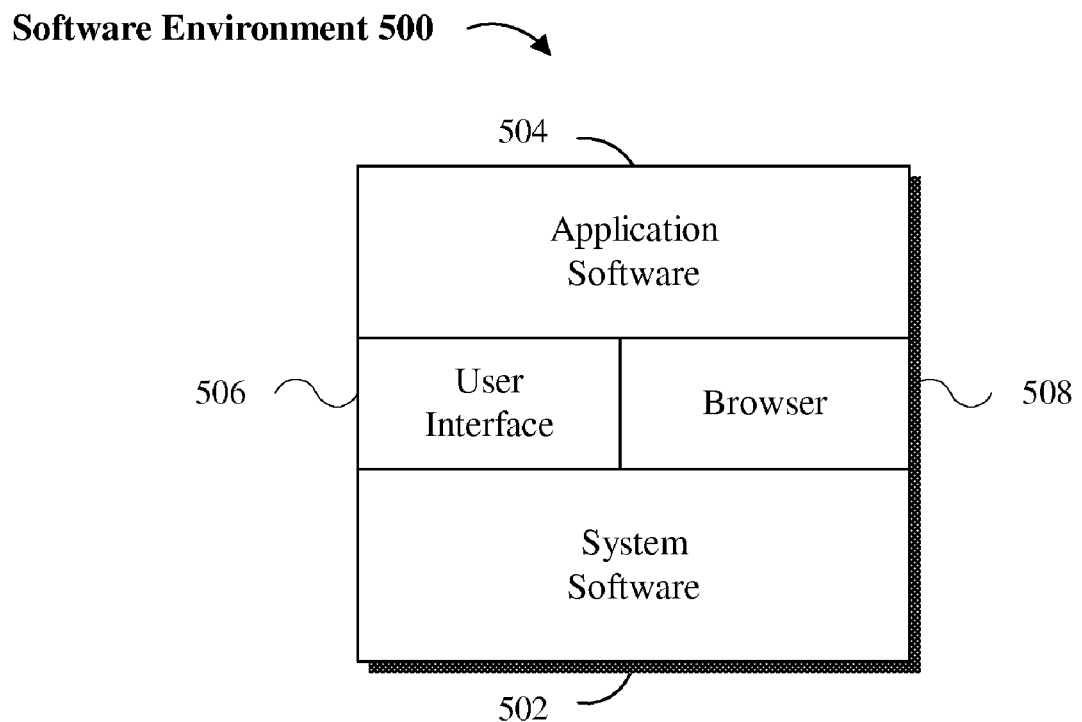

Referring to FIGS. 4 and 5, a computing system environment in accordance with an exemplary embodiment is composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two major classes comprising system software 502 and application software 504. System software 502 comprises control programs, such as the operating system (OS) and information management systems that instruct the hardware how to function and process information.

In one embodiment, data management module 112 may be implemented as system software 502 and application software 504 executed on one or more hardware environments to facilitate data restoration and backup. Application software 504 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the system software 502 and application software 504 can be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, system software 502 and application software 504 can comprise one or more computer programs that are executed on top of operating system 112 after being loaded from storage media 408 into local memory 406. In a client-server architecture, application software 504 may comprise client software and server software. For example, in one embodiment of the invention, client software is executed on computing systems 110 or 120 and server software is executed on a server system (not shown).

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method of swapping first data stored on a first volume having a first plurality of tracks with second data stored on a second volume having a second plurality of tracks, the method comprising:
    associating a first value with a first track on the first volume to indicate that I/O access requests to the first track of the first volume are to be redirected;
    associating a first value with a first track on the second volume to indicate that I/O access requests to the first track of the second volume are to be redirected;
    limiting I/O access to the first track on the first volume;
    limiting I/O access to the first track on the second volume;
    copying data stored on the first track on the first volume to a temporary storage medium;
    copying data stored on the first track on the second volume to the temporary storage medium;
    swapping data stored on the first track of the first volume with data stored on the first track of the second volume;
    allowing I/O access to the first track on the first volume;
    allowing I/O access to the first track on the second volume;
    redirecting an I/O access to the first track on the first volume to the first track on the second volume, in response to determining that the first value is associated with the first track of the first volume;
    redirecting an I/O access to the first track on the second volume to the first track on the first volume, in response to determining that the first value is associated with the first track of the second volume,
    wherein the redirecting processes are performed during to a period when the swapping process is in progress, such that I/O calls directed to tracks with swapped data are redirected, and I/O calls directed to tracks with unswapped data are not;
    providing I/O access directly to a second track on the first volume, in response to determining that the first value is not associated with the second track on the first volume; and
    providing I/O access directly to a second track on the second volume, in response to determining that the first value is not associated with the second track on the second volume;
    associating a first value with the second track on the first volume to indicate that I/O access requests to the second track of the first volume are to be redirected;
    associating a first value with a second track on the second volume to indicate that I/O access requests to the second track of the second volume are to be redirected;
    limiting I/O access to the second track on the first volume;
    limiting I/O access to the second track on the second volume;
    copying data stored on the second track on the first volume to the temporary storage medium;
    copying data stored on the second track on the second volume to the temporary storage medium;
    swapping data stored on the second track of the first volume with data stored on the second track of the second volume;
    redirecting an I/O access to the second track on the first volume to the second track on the second volume, in response to determining that the first value is associated with the second track of the first volume; and
    redirecting an I/O access to the second track on the second volume to the second track on the first volume, in response to determining that the first value is associated with the second track of the second volume.

2. The method of claim 1 further comprising:
    limiting I/O access to the first and second volumes;
    disassociating the first value with the first and second tracks of the first volume;
    disassociating the first value with the first and second tracks of the second volume;
    unmounting and remounting the first and the second volumes such that I/O requests designated for the first volume are directed to the second volume, and I/O requests designated for the second volume are directed to the first volume.

3. The method of claim 1, wherein the temporary storage medium comprises a cache.

4. The method of claim 1, wherein the temporary storage medium comprises a cache.

5. The method of claim 1, wherein the swapping is performed using an XOR swapping algorithm.

6. The method of claim 1, wherein the I/O access comprises at least one of a read or a write operation.

7. A system for swapping first data stored on a first volume having a first plurality of tracks with second data stored on a second volume having a second plurality of tracks, the system comprising:
    a logic unit for associating a first value with a first track on the first volume to indicate that I/O access requests to the first track of the first volume are to be redirected;
    a logic unit for associating a first value with a first track on the second volume to indicate that I/O access requests to the first track of the second volume are to be redirected;
    a logic unit for limiting I/O access to the first track on the first volume;
    a logic unit for limiting I/O access to the first track on the second volume;
    a logic unit for copying data stored on the first track on the first volume to a temporary storage medium;

a logic unit for copying data stored on the first track on the second volume to the temporary storage medium;
a logic unit for swapping data stored on the first track of the first volume with data stored on the first track of the second volume;
a logic unit for allowing I/O access to the first track on the first volume;
a logic unit for allowing I/O access to the first track on the second volume;
a logic unit for redirecting an I/O access to the first track on the first volume to the first track on the second volume, in response to determining that the first value is associated with the first track of the first volume;
a logic unit for redirecting an I/O access to the first track on the second volume to the first track on the first volume, in response to determining that the first value is associated with the first track of the second volume,
wherein the redirecting processes are performed during to a period when the swapping process is in progress, such that I/O calls directed to tracks with swapped data are redirected, and I/O calls directed to tracks with unswapped data are not;
a logic unit for providing I/O access directly to a second track on the first volume, in response to determining that the first value is not associated with the second track on the first volume;
a logic unit for providing I/O access directly to a second track on the second volume, in response to determining that the first value is not associated with the second track on the second volume;
a logic unit for associating the first value with the second track on the first volume to indicate that I/O access requests to the second track of the first volume are to be redirected;
a logic unit for associating the first value with the second track on the second volume to indicate that I/O access requests to the second track of the second volume are to be redirected;
a logic unit for limiting I/O access to the second track on the first volume;
a logic unit for limiting I/O access to the second track on the second volume;
a logic unit for copying data stored on the second track on the first volume to the temporary storage medium;
a logic unit for copying data stored on the second track on the second volume to the temporary storage medium;
a logic unit for swapping data stored on the second track of the first volume with data stored on the second track of the second volume;
a logic unit for redirecting an I/O access to the second track on the first volume to the second track on the second volume, in response to determining that the first value is associated with the second track of the first volume; and
a logic unit for redirecting an I/O access to the second track on the second volume to the second track on the first volume, in response to determining that the first value is associated with the second track of the second volume.

8. The system of claim 7 further comprising:
a logic unit for limiting I/O access to the first and second volumes;
a logic unit for disassociating the first value with the first and second tracks of the first volume;
a logic unit for disassociating the first value with the first and second tracks of the second volume;
a logic unit for unmounting and remounting the first and the second volumes such that I/O requests designated for the first volume are directed to the second volume, and I/O requests designated for the second volume are directed to the first volume.

9. The system of claim 7, wherein the temporary storage medium comprises a cache.

10. The system of claim 7, wherein the swapping is performed using an XOR swapping algorithm.

11. The system of claim 7, wherein the I/O access comprises a read operation.

12. The system of claim 7, wherein the I/O access comprises a write operation.

* * * * *